Figure 1:
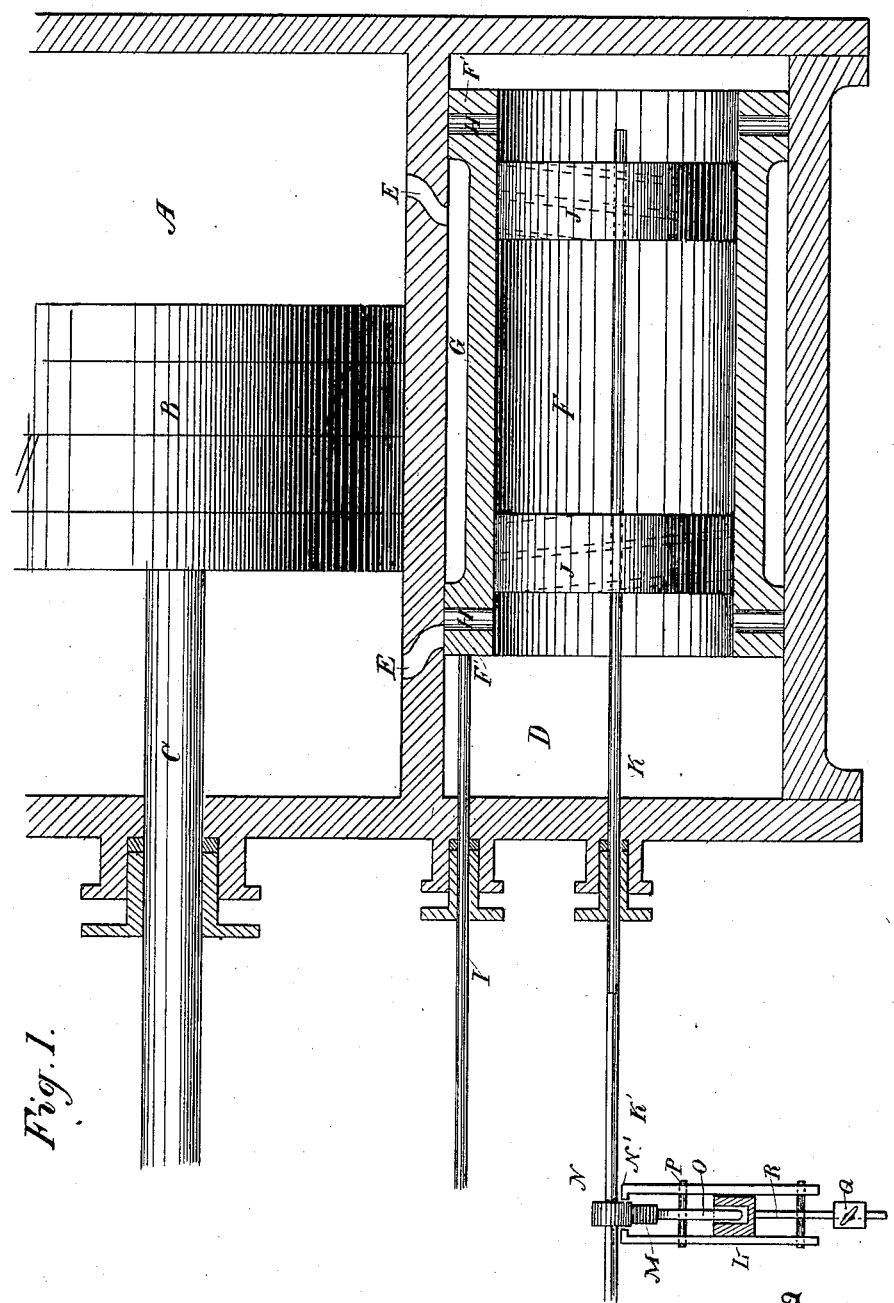

(No Model.)  2 Sheets—Sheet 1.

H. J. OLIVER.
CUT-OFF VALVE FOR ENGINES.

No. 323,065.  Patented July 28, 1885.

Witnesses,
Geo. H. Strong.

Inventor,
H. J. Oliver
By Dewey & Co.
Attorneys

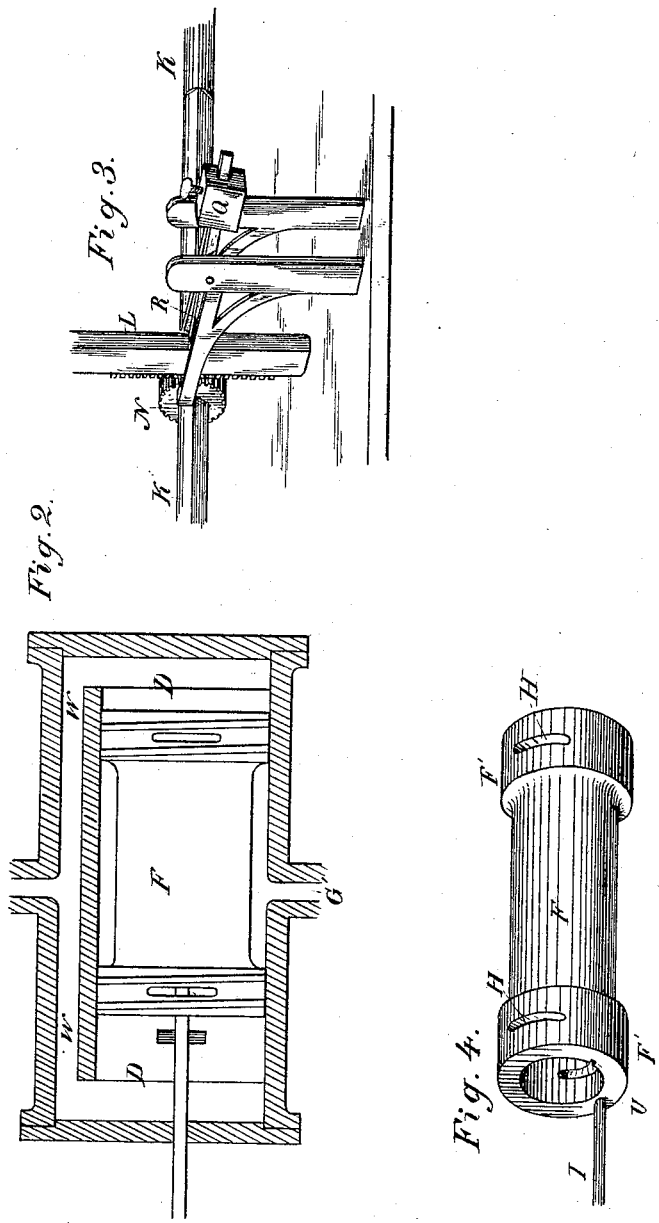

UNITED STATES PATENT OFFICE.

HENRY JOSEPH OLIVER, OF SAN FRANCISCO, CALIFORNIA.

CUT-OFF VALVE FOR ENGINES.

SPECIFICATION forming part of Letters Patent No. 323,065, dated July 28, 1885.

Application filed January 24, 1885. (No model.)

*To all whom it may concern:*

Be it known that I, HENRY J. OLIVER, of the city and county of San Francisco, State of California, have invented an Improvement in Cut-Off Valves for Engines; and I hereby declare the following to be a full, clear, and exact description of the same.

My invention relates to certain improvements in valve-gear for engines; and it consists, mainly, in the employment of a hollow piston-valve working within a valve-chamber having passages by which steam may be admitted freely to both ends of the valve, hollow cylindrical cut-off valves working within the main valve, which is provided with suitable steam-ports, a governor, and intermediate mechanism connecting it with the cut-off valve, so that they may be adjusted to regulate the supply of steam to the work to be done, and in certain details of construction, all of which will be more fully explained by reference to the accompanying drawings, in which—

Figure 1 is a horizontal section of an engine-cylinder, with valve-chamber, showing also section of the main valve with the cut-off valve inside the valve and stems, and a mechanism connecting the cut-off with the governor. Fig. 2 is a vertical section of the valve-chamber, showing the steam-passages opening into each end. Fig. 3 is a perspective view showing the cut-off-valve stem with the pinion, and connecting mechanism from the governor. Fig. 4 is a perspective view of the main valve. Fig. 5 is a perspective view of the cut-off valve.

A is the main cylinder of a steam or other engine, having a piston, B, working within it, and a piston-rod, C.

D is the valve-chamber, which is bored out cylindrically, its axis being parallel with that of the main cylinder.

E E are steam-ports leading from the valve-chamber to the main cylinder, and through these steam is alternately admitted to the opposite ends of the cylinder to drive the piston.

F is the main valve, the ends of which F' are made of such diameter as to fit within the cylindrical valve-chamber D, and they may be provided with packing-rings, or otherwise fitted, so as to move steam tight.

The portion F of the main valve which connects the two ends is made of considerably smaller diameter, so that there will be a space, G, around it, which connects with the passage G', and serves for the escape of the steam from the main cylinder after it has done its work. The ends F' of the main valve have ports H made through them, these ports being made opposite to each other through each of the heads F', so as to balance the valve. The movement of this valve is produced by a valve-rod, I, which may be connected with the main shaft or other moving part of the engine, and passes into the valve-chamber through a suitable stuffing-box, so as to attach to one side of the valve, as shown. The movement of the valve is never sufficient to allow its outer ends to uncover the ports E; but the movement is so made as to bring the ports H opposite the ports E, to admit steam to the steam-engine cylinder, the opposite port being at the same time in connection with the interior space, G, around the valve, so as to allow the engine to exhaust from the end.

The cut-off valve consists of two cylinders, J, fitted to move steam-tight within the main valve F, and having a rod, K, extending to them from some moving part of the engine so that they may be caused to reciprocate. These valves J are hollow cylinders, and are so adjusted that they will fully uncover the ports H through the main valve, so that steam may be admitted through these ports and the ports E into the main cylinder, and after the movement of the main piston is commenced the cut-off valves will be moved so as to close the ports H at any desired point in the stroke. This point is determined by the speed or power which it is desired to give the engine, and is regulated by the governor, which is connected so as to act upon the valves J, as follows:

L is a vertical stem or spindle which is connected with the governor (not here shown, but which may be of any suitable or desired construction) so as to cause the stem L to move up or down by a change in the speed of the governor.

A straight-toothed rack may be formed on or secured to the governor-spindle L, which would in this case be placed so near as to engage the pinion N on the valve-stem, thus turning it directly from the spindle without intermediate mechanism.

I have also shown another device in which

M is a quadrant having its curved outer face toothed so as to engage with a pinion, N, fitted loosely upon the square portion K' of the cut-off-valve stem K, for a purpose to be herein-after described. The quadrant M has a shank, O, projecting rearwardly from it, and it may have a fulcrum-pin passing through a hole in it, as shown at P. The rear end of the shank O enters a slot in the governor-stem L, so that when the stem is moved up or down it will act upon the arm and the quadrant M, and through it rotate the pinion N and the valve-stem. Q is a weight which may be adjusted upon a lever-arm, R, which is suitably fulcrumed and connects with the governor-stem L, as shown in Fig. 3. Upon that portion of the valve-stem K which passes through the cut-off valves J two arms, S, are fixed, so as to project radially from the rod to the inside of the valves. The interior of these valves have screw-threads cut upon them, one being a right and the other the left hand screw, and the ends of the arms are fitted to enter these threads, so that when the stem K is turned in one direction these arms, following the threads within the valves, will cause them to approach each other, thus exposing the steam-ports H a greater length of time and admitting the steam for a greater portion of the stroke of the piston, and when turned in the opposite direction the valves will be separated and act to cut off the steam sooner. This movement of the valves is produced by the action of the governor-spindle rack and the pinion N, as before described.

In order to prevent these valves from being turned about by the movement of the stem, they have lugs T projecting from one side, and these lugs enter a longitudinal slot or channel, U, which is made in the side of the main valve F. This causes their movement to be simply reciprocating without a tendency to be turned around on their axes. The pinion N is loosely fitted upon the square portion K' of the valve-stem, and it turns between two fixed lugs or standards, (shown at N', Fig. 1.) These lugs prevent the pinion from moving so as to get out of contact with the gear; but when it is rotated it turns the valve-stem K, while at the same time allowing the latter to be moved endwise by its eccentric, and this causes the valves J J to be moved to and from each other by the action of the screw, as before described.

In order to prevent any wire-drawing of the steam by reason of an insufficient supply, which might occur if the interior of the valves was very small, or if a considerable quantity of steam was being used, I make the chambers W, through which steam is admitted to the interior of the valves F and J from the opposite ends, so that both of the steam-ports receive a supply in the most direct manner.

Having thus described my invention, what I claim as new, and desire to secure by Letters Patent, is—

1. In an engine, the main cylinder having ports opening in its opposite ends, in combination with reciprocating cut-off valves, a cylindrical valve-chamber having a hollow main valve provided with a longitudinal slot or channel, U, and with enlarged ends, and ports made through said ends upon opposite sides to admit steam and balance, while the central portion of the valve is reduced in size so as to form an escape-passage for the exhaust-steam, substantially as herein described.

2. In an engine, the main cylinder having ports connecting its ends with a valve-chamber, and a hollow main valve having its ends fitting the interior of the valve-chamber and provided with steam-ports, while the central portion of the valve is reduced, as shown, in combination with a concentric hollow cylindrical cut-off valve fitting to and moving within the main valve, substantially as herein described.

3. In an engine, the main cylinder having ports connecting with its opposite ends, a valve-chamber into which said ports open, a main valve having its ends fitted to the cylinder, and ports made through these ends to correspond with those of the cylinder, cut-off valves having a rod concentric therewith and by which they are caused to reciprocate within the main valve, and spiral or screw flanges with corresponding arms engaging them from the rod, so that the valves may be moved to or from each other by the turning of the valve-rod, substantially as herein described.

4. In an engine, the main cylinder and main valves with the intermediate and connecting ports, as shown, the cut-off valves provided with the guiding-lugs and moving with the main valve so as to uncover and expose its ports, the spiral flanges, and adjusting-arms from the valve-rod, in combination with a pinion secured to the valve-rod, and a gear engaging said pinion and actuated by the movement of the governor-stem, substantially as herein described.

5. The pinion N, secured to the cut-off-valve stem, and the toothed quadrant M, engaging said pinion and having a lever-arm extending backward and connected with the governor-stem, in combination with the counterbalance-weight Q, substantially as herein described.

6. The pinion B, secured to the cut-off-valve stem, and the gear or toothed quadrant M, actuated by the governor-stem so as to rotate the pinion N, in combination with the standards or lugs N', whereby the pinion is prevented from having end movement, substantially as herein described.

In witness whereof I have hereunto set my hand.

HENRY JOSEPH OLIVER.

Witnesses:
H. F. ASCHECK,
T. J. JOHNSTON.